United States Patent [19]

Ronconi et al.

[11] Patent Number: 4,509,868
[45] Date of Patent: Apr. 9, 1985

[54] TEMPERATURE INDICATING DEVICE FOR A COOKING POT AND DEVICE-POT COMBINATION

[76] Inventors: Mario Ronconi, Via Goethe, 132, 24100 Bergamo; Renzo Civitani, Via Conciliazione, 29, 20031 Cesano Maderno, both of Italy

[21] Appl. No.: 386,360

[22] Filed: Jun. 8, 1982

[30] Foreign Application Priority Data

Jun. 15, 1981 [IT] Italy ................ 22084/81[U]

[51] Int. Cl.³ .......... G01K 13/00; G01K 7/14
[52] U.S. Cl. .................... 374/141; 99/342; 340/784; 350/331 T; 364/557; 374/170; 374/178
[58] Field of Search ........ 374/149, 178, 141, 162; 350/331 R, 331 T; 340/870.44, 870.21, 870.17, 753, 784, 765; 99/342, 343

[56] References Cited

U.S. PATENT DOCUMENTS

| | | | |
|---|---|---|---|
| 1,716,473 | 6/1929 | Weisenfels | 374/149 X |
| 3,582,921 | 6/1971 | Krieger | 340/870.17 X |
| 3,701,344 | 10/1972 | Walls et al. | 99/342 X |
| 3,736,861 | 6/1973 | Kroyer et al. | 374/141 X |
| 3,955,420 | 5/1976 | Parker | 374/162 |
| 4,012,117 | 3/1977 | Lazzery | 350/331 R |
| 4,028,057 | 6/1977 | Nelson | 340/870.44 |
| 4,068,138 | 1/1978 | Miyakawa et al. | 374/170 X |
| 4,198,676 | 4/1980 | Varnum et al. | 374/185 X |
| 4,206,501 | 6/1980 | Brooks | 350/331 T X |
| 4,242,679 | 12/1980 | Morozumi et al. | 350/331 T X |
| 4,278,325 | 7/1981 | Kondo et al. | 368/84 X |

Primary Examiner—Daniel M. Yasich
Attorney, Agent, or Firm—Fidelman, Wolffe & Waldron

[57] ABSTRACT

This invention relates to a temperature indicating device for pots and to a device-pot combination comprising a sensor and an indicator circuit for the temperature internally attained by the pot, characterized in that the temperature sensor is a part of the pot and the latter is thermally connected by means of good thermal conductive material to a transducer for converting the information from a temperature into an electric quantity. Advantageously, the temperature indicating device can be applied both to the pot-lid and to the handle.

6 Claims, 3 Drawing Figures

TEMPERATURE INDICATING DEVICE FOR A COOKING POT AND DEVICE-POT COMBINATION

This invention relates to a temperature indicating device, particularly for a cooking pot, comprising a sensor of the temperature attained within the pot and a temperature indicator-display circuit.

The application of analog thermometers to the glass of an oven is known. It is also well known the application of mechanical thermometers to pot lids in order to specify and display the temperature attained within the container. A disadvantage of these analog thermometers is that the temperature sensor is of reduced size and contacts the steam and smoke produced by cooking. Therefore, said sensor gets readily dirty unabling the correct temperature sensing. Moreover, reading is not easy.

With the improvement in food preparing art, particularly in those culinary arts wherein neither water nor fats are used, the practical and exact specification of the temperature attained inside the container has become essential.

It is the object of the present invention to provide a temperature indicating device capable of sensing with sufficient reliability the temperature attained within the pot and displaying it in a simple and readily accessible way by the user.

The object is accomplished by providing that the temperature sensor is a part of the pot and is thermally connected by means of good thermal conductive material with a transducer for converting the temperature into an electric quantity.

A solution provides that said transducer is particularly a transistor.

A preferred embodiment of the invention provides that the indicator circuit comprises an analog-to-digital (A/D) converter and a display.

Another embodiment of the invention provides that the indicator circuit includes an adjustable threshold circuit for showing on the display the attained temperature, when the latter exceeds a predetermined threshold.

A further embodiment of the invention provides that said indicator device is engageable with the pot lid, wherein said lid is considered an integral part of the pot.

A still further embodiment of the invention provides that said device is engageable with the pot handle.

The above stated features, as well as the objects and advantages of the invention, are exemplified by the following description of a preferred embodiment, shown with reference to the accompanying drawings, in which.

By way of example, the pot temperature indicating device is hereinafter shown as applied to the pot lid; but it shall be understood that, by changes quite obvious to those skilled in the art, said indicating device may be applied to any portion of the pot, such as to a handle.

Figure 1:
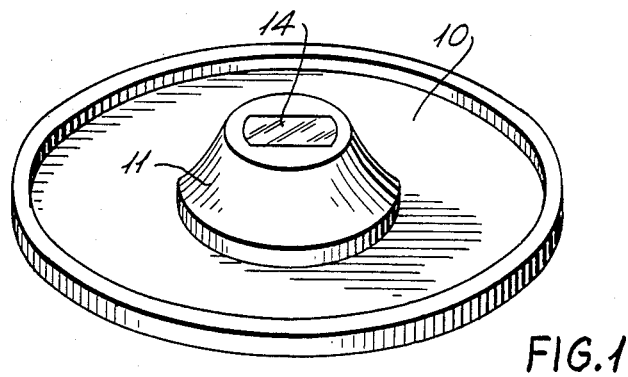
FIG. 1 is a schematic perspective view showing a solution of the present invention incorporating an electronic temperature indicator comprising a display, such as a liquid crystal display.

FIG. 1 schematically shows a lid 10 for the pot, not shown, intended for food cooking. Said lid and pot may, for example, be of the type for cooking without any addition of water or fats, owing to a special thermal bottom of the pot, which is no part of the present invention.

According to the invention, the knob or ball-grip 11, screwable to the pot, has a blind thread 12 cooperating with the threaded stem 13 rigidly integral with the lid. Both threads are made of thermal conductive material. In this solution, said lid 10 constitutes the sensor (thermal feeler) of the temperature internally attained by the pot. Said sensor is particularly wide and accordingly capable of supplying good analog information of the temperature attained within said pot. As it will be seen from FIG. 1, at the top of said knob there is arranged a digital display 14, such as a liquid crystal display, which in this embodiment has the same size as that normally provided in a wrist-watch. Said display may be a two or three digits display and may trigger at every one degree, at every tenth of degree, or at 2, 3, or 5 degrees depending on the type of adjustment being provided in well known manner.

Figure 2:
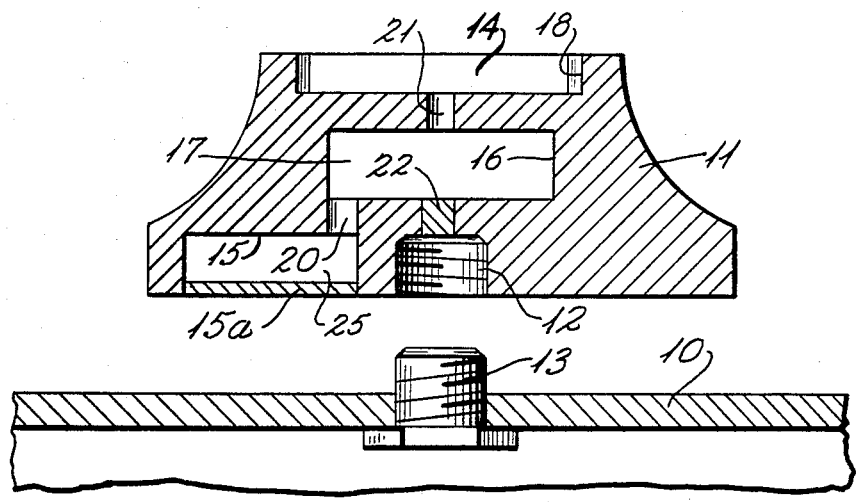
FIG. 2 is a schematic sectional view showing the knob of the pot lid.

FIG. 2 is a view showing the internal configuration for the lid knob to accomodate the device according to the invention. As it will be seen, it has a seating 15 for the power supply 25. Said seating is closed by a protective device 15a, the latter being quite thermally insulated. The seating 16 for the indicator circuit 17 and the seating 18 for accomodating said display 14 are also provided. Between said seating 16 and blind thread 12 there is provided a zone 22 comprising good thermal conductive material, such as metal.

Figure 3:
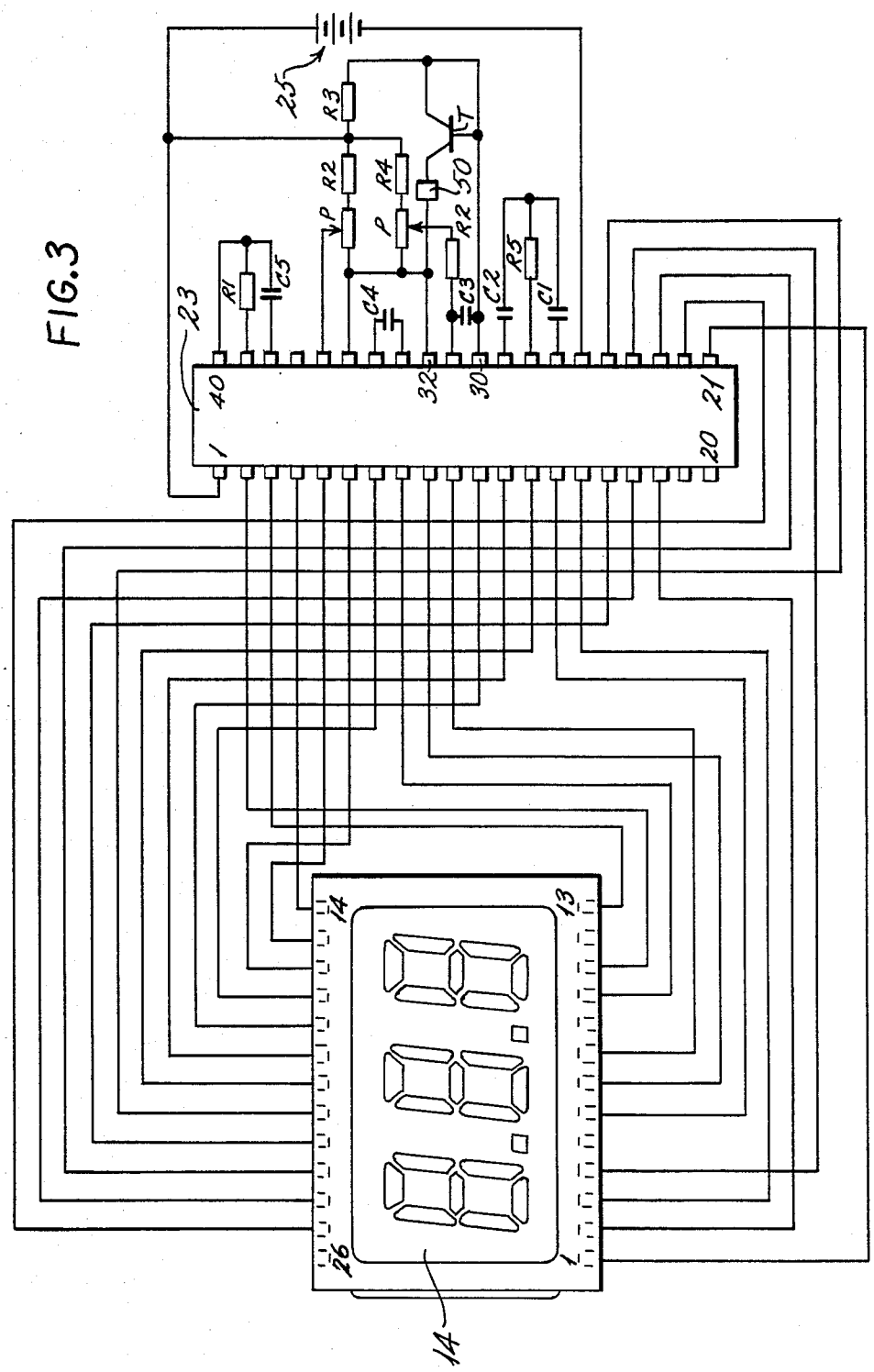
FIG. 3 shows an example of an electronic circuit for converting the temperature value attained by the sensor into digital form.

The circuit 17, shown in FIG. 3, provides a transducer T for converting the analog information in the form of temperature into electric quantity. In this embodiment, it comprises a NPN transistor type 2N2222. Said transistor is thermally connected to zone 22 or directly contacts blind thread 12.

The emitter junction voltage of said type of transistor is proportional to the temperature in a linear way, at least in the range of temperatures attained within a cooking-pot. The voltage difference, which depends on the temperature sensed by the sensor, is sent to inputs 30 and 32 of analog-to-digital (A/D) converter 23. Said converter supplies the information of the sensed temperature, as suitably converted into digital form, to the displaying device 14. The assembly is supplied by the power supply 25, in this case comprising a pad battery.

Since said power supply 25 is positioned at the bottom of the knob, for the change thereof it will suffice to unscrew the lid from said knob and remove the protective device 15a. The circuit may provide a threshold device 50, for example a thermal switch, for displaying on said display a temperature higher than a predetermined threshold level. A suitable calibrating circuit is also present, which comprises potentiometers P.

By mere way of example, the following table shows the values of the components of a preferred embodiment:

R1 = 100 Kohm
R2 = 1 Mohm
R3 = 22 Kohm
R4 = 220 Kohm
R5 = 47 Kohm

C1 = 0.22 μF
C = 0.47 μF

C3 = 0.01 μF
C4 = 0.1 μF
C5 = 100 pF

Also according this preferred embodiment, the analog-to-digital converter is an integrated device, I.C.L. 7106, manufactured by INTERSIL and the display device is a model 203 manufactured by OPTRONIX.

Thus, it will be evident that the sensor is part of the pot which better than any other external element is capable of supplying the thermal information of the temperature attained within the pot. Said analog information, perfectly corresponding to the physical reality and converted into electric form energizes the display of easy reading, displaying the actually attained temperature to the user.

What we claim is:

1. A thermometer device for a cooking receptable, comprising in combination:
    means, coacting with at least a portion of said cooking receptable, for sensing variations of temperature within said receptable;
    transducer means, operatively connected with said sensing means, for converting said temperature variations attained during said sensing to corresponding electrical variations;
    A/D (analog-to-digital) circuit means, operatively associated with said transducer means, for converting said electrical variations from analog signals to digital signals; and
    means, operatively associated with said A/D means, for displaying said temperature variations according to said electrical variations and displaying said temperature variations as digital display variations.

2. A device as in claim 1, wherein:
    said transducer means and said display means are attached to a lid for said receptable.

3. A device as in claim 2, wherein:
    said transducer means and said display means are incorporated into a knob for said lid.

4. A device as in claim 1, wherein said display means comprises:
    a liquid crystal diode digital display.

5. A device as in claim 1, wherein said transducer means comprises:
    a transistor.

6. A device as in claim 1, and further comprising:
    thermal switch means, operatively associated with said display means, for limiting said display variations to temperatures above a threshold temperature.

* * * * *